V. BARKER.
SPRING WHEEL.
APPLICATION FILED JULY 18, 1917.
1,250,942.
Patented Dec. 25, 1917.
2 SHEETS—SHEET 1.
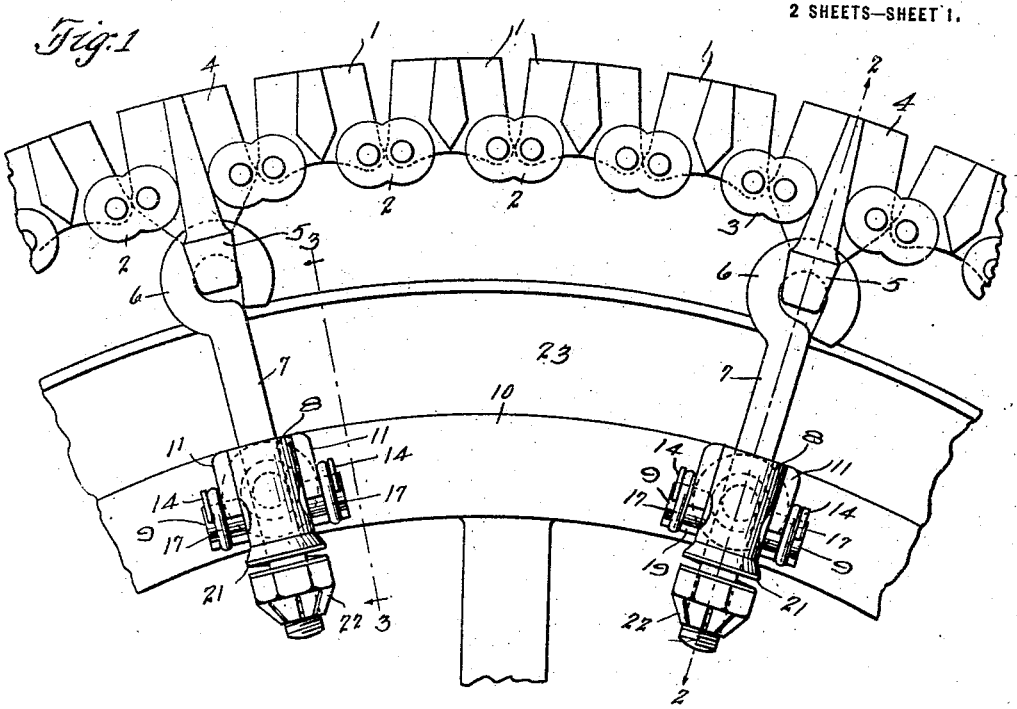
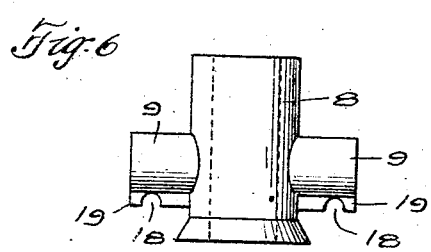
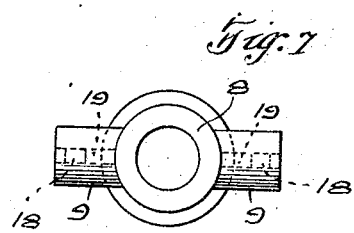
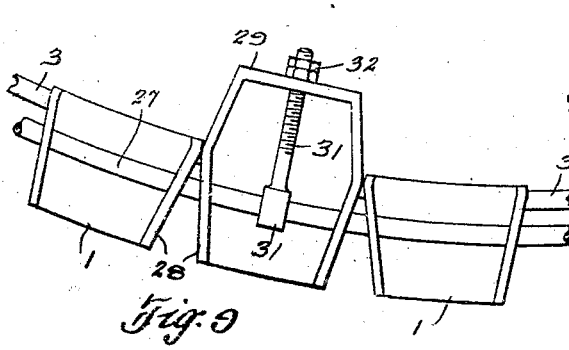
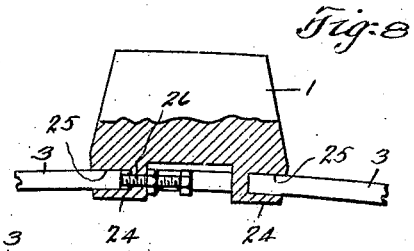
V. BARKER, Inventor
By John A. Bommhardt
Attorney V. BARKER.
SPRING WHEEL.
APPLICATION FILED JULY 18, 1917.
1,250,942.
Patented Dec. 25, 1917.
2 SHEETS—SHEET 2.
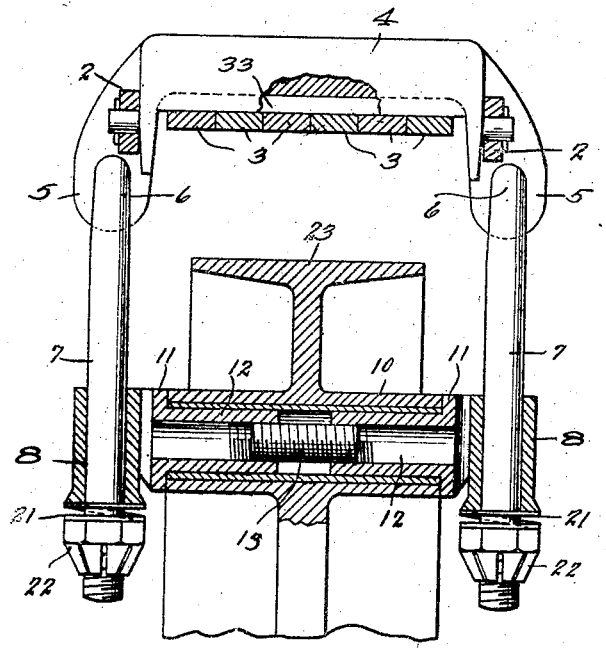
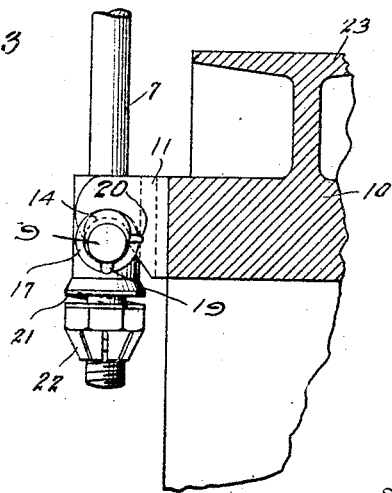
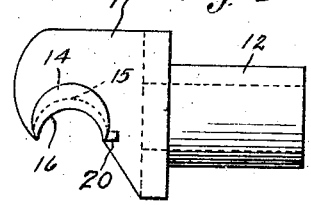
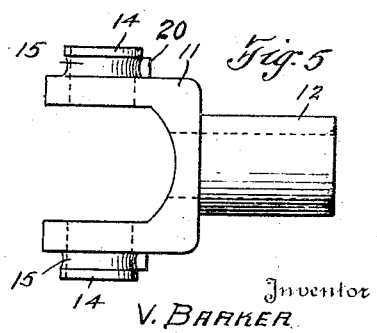
Inventor
V. BARKER
By John A. Bommhardt
Attorney

UNITED STATES PATENT OFFICE.

VALMOND BARKER, OF CLEVELAND, OHIO.

SPRING-WHEEL.

1,250,942.   Specification of Letters Patent.   Patented Dec. 25, 1917.

Application filed July 18, 1917. Serial No. 181,223.

*To all whom it may concern:*

Be it known that I, VALMOND BARKER, a citizen of the United States, residing at Cleveland, in the county of Cuyahoga and State of Ohio, have invented certain new and useful Improvements in Spring-Wheels, of which the following is a specification.

This invention relates to spring wheels, and has for its object to provide an improved wheel having an outer rim made of a number of tread blocks or segments which are spring supported with respect to the inner part of the wheel, said inner part being supported by the rim in such manner as to give resiliency without the use of pneumatic or similar devices, the inner part of the wheel being suspended within the rim which is distended by inner circumferential springs.

The details of the construction will be fully evident from the following description and accompanying drawings in which—

Figure 1 is a side elevation of a part of a wheel embodying the invention;

Fig. 2 is a section on the line 2—2 of Fig. 1;

Fig. 3 is a section on the line 3—3 of Fig. 1;

Fig. 4 is a side elevation of one of the connecting devices which is pivotally mounted in the felly;

Fig. 5 is a top plan of the device shown in Fig. 4;

Fig. 6 is a side elevation of an attaching device through which the suspending bolts pass;

Fig. 7 is an end view of Fig. 6;

Fig. 8 is a detail showing the manner of tightening the springs which distend the rim; and Fig. 9 is a detail in side elevation of a modification.

Referring specifically to the drawings, 1 indicates a series of metal tread blocks which compose the rim. These blocks are connected at opposite sides by pivoted links 2, and the rim or ring so formed is held in circular distended position by a series of flat springs 3 which extend around within the rim and press against the inner sides or surfaces of the blocks, thereby holding the rim in substantially circular form, although the springs will yield to accommodate shock or weight.

Some of the tread blocks, at regular intervals around the rim as indicated at 4, are provided with outwardly extending ears 5 which receive the hooked ends 6 of bolts 7, by means of which the inner part of the wheel and the rim are connected together.

Loosely mounted on the inner ends of the bolts 7 are guide sleeves 8, each of which has a pair of circular lugs 9 projecting at opposite sides thereof, and the sleeves are retained on the bolts by nuts 22 with springs 21 between the nuts and the sleeves to cushion the movement.

The wheel felly, proper, is indicated at 10, and at points corresponding to the location of the links or bolts 7 it is bored transversely to receive hollow shanks or trunnions 12 projecting from forked blocks 11. The trunnions are internally threaded and are connected by a bolt 13 between each pair. The forks of each block 11 span or embrace the outer part of the sleeve 8, and have projections 14 at each side which are arced or hooked as indicated at 16, and these hooked parts engage the circular lugs 9 projecting from the sleeves 8, as shown in Figs. 1 and 3. To hold the lugs and the forks together, split rings 17 are sprung around the same, said rings resting in grooves 15 in the projections 14 and in a notch 18 in a rib 19 on the inner side of the lugs 9. The weight of the wheel is sustained by the lugs 9 and the forks 11, the ring 17 simply serving to prevent accidental disengagement of the parts under rebound. The rings 17 are held from turning by lugs 20 on the projections 14, the lugs fitting between the ends of the rings.

It will be noted that the hooks 6 form a universal connection between the ears 5 and the bolts 7, and the blocks 11 and lugs 9 also form a universal connection between the felly and said bolts 7, since the trunnions 12 can turn on a transverse axis, and the lugs 9 can turn on tangential axes, and, also the bolts 7 have limited play lengthwise in the sleeves 8. And these connections permit of the necessary changes in relative position between the parts incident to vibration or the spring action of the wheel.

The outer face or part of the felly is provided with a T-shaped extension indicated at 23, the circumferential surface of which is spaced a sufficient distance from the springs 3 supporting the rim of tread blocks. Under excessive weight or shock this part 23 drops to contact with the springs or blocks thereby limiting the spring action and giving a rigid support for the inner part of the wheel.

Fig. 8 shows the manner of expanding the rings 3. For each ring, one of the blocks 1 has a pair of hooked projections 24 with recesses 25 which receive the ends of the spring 3. One of these hooks is provided with a screw 26 which bears against one end of the spring, and by turning this screw the spring is expanded to an extent sufficient to fully distend the same, or to hold it at desired adjustment. The blocks at which the ends of the respective springs 3 are connected are preferably disposed at different points around the circumference so that all the joints are not at the same place or point in the circumference.

In Fig. 9 a modification is illustrated. Instead of the links 2 the tread blocks 1 are connected by cables 27 one of which extends around each side of the rim, through holes in flanges 28 at the sides of the blocks, whereby they are held in the form of a complete ring by means of the springs 3 within the same. Each cable is held by an eye bolt 31 the stem 30 of which is secured by nuts 32 in an extension 29 on the inner side of some of the blocks.

If desired, a packing of brake lining or similar material 33 may be placed between the springs 3 and the tread blocks, as shown in Fig. 2, for the purpose of preventing any squeaks incident to the tread blocks rubbing against the springs, said packing being seated in recesses in the inner side of the blocks.

In the use of the wheel, it will be understood that the rim of blocks is distended by the springs 3 to the full extent, and the felly and the inner part of the wheel is suspended within this rim, by means of the bolts 7 and the other connections, the weight coming on the upper part of the rim by tension on the bolts 7. Therefore the rim tends to assume an elliptical shape, more or less, and road shocks are absorbed by the spring rim, without being transmitted directly to the inner part of the wheel. The advantages of a resilient wheel are thus obtained. At the lower part of the wheel, or the part nearest the ground, the bolts 7 will work in and out to a limited extent in the sleeves 8, and the universal connections permit the bolts 7 to assume various positions with respect to radial lines, to accommodate the distortion of the rim, whereby bending or fracture of the bolts is prevented.

I claim:

1. A wheel provided with a rim composed of tread blocks flexibly connected together, guides pivotally connected to the wheel felly, rods movable radially in the guides and flexibly connected to some of the blocks, and a spring ring fitting within the rim and tending to distend the same.

2. A wheel provided with a rim composed of tread blocks, guides having trunnions fitting in bearings at opposite sides of the felly, connecting rods slidable in the guides and pivoted at their outer ends to some of the blocks, and a continuous spring ring fitting within the rim and tending to distend the same.

3. A wheel provided with a rim composed of tread blocks pivotally connected to each other, tension connections between opposite sides of some of the blocks and the wheel felly, and spring rings fitting within the rim and acting to distend the same.

4. A wheel provided with a flexible rim, a spring distending the same, a felly, blocks pivoted to the felly, at opposite sides thereof, guides having lugs flexibly engaging the blocks, and tension bolts connected to the rim and working in said guides.

5. A wheel provided with a flexibly distended rim, a felly, forked blocks having trunnions mounted in the felly to turn on transverse axes, sleeves having lugs engaging the forks of the blocks, and connecting bolts between the sleeves and the rim.

6. A wheel provided with a rim composed of blocks pivotally connected to each other, a spring extending around within the rim and serving to distend the same, one of the blocks having means to hold opposite ends of the spring.

7. A wheel provided with a rim composed of blocks pivotally connected to each other, a spring extending around within the rim and serving to distend the same, one of the blocks having means to hold opposite ends of the spring and also having means bearing on the end of the spring to expand the same.

In testimony whereof, I do affix my signature in presence of two witnesses.

VALMOND BARKER.

Witnesses:
JOHN A. BOMMHARDT,
G. W. ROSENBERG.